US007089545B2

(12) United States Patent
Bera (10) Patent No.: US 7,089,545 B2
(45) Date of Patent: Aug. 8, 2006

(54) DETECTION OF REDUCTION VARIABLES IN AN ASSIGNMENT STATEMENT

(75) Inventor: Rajendra K. Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 10/321,971

(22) Filed: Dec. 17, 2002

(65) Prior Publication Data

US 2004/0117781 A1 Jun. 17, 2004

(51) Int. Cl.
*G06F 9/45* (2006.01)

(52) U.S. Cl. .................. 717/160; 717/150; 717/151; 717/154; 717/161

(58) Field of Classification Search ......... 717/151–161
See application file for complete search history.

(56) References Cited

U.S. PATENT DOCUMENTS

| | | | | |
|---|---|---|---|---|
| 5,363,473 A * | 11/1994 | Stolfo et al. | ................ | 706/45 |
| 5,481,723 A | 1/1996 | Harris et al. | ................ | 395/700 |
| 6,282,704 B1 * | 8/2001 | Iitsuka | .................... | 717/150 |
| 6,367,071 B1 * | 4/2002 | Cao et al. | .................... | 717/160 |
| 6,578,196 B1 * | 6/2003 | Bera | ..................... | 717/141 |
| 6,738,967 B1 * | 5/2004 | Radigan | ................... | 717/146 |
| 2001/0003211 A1 | 6/2001 | Bera | ........................ | 717/4 |
| 2003/0056083 A1 * | 3/2003 | Bates et al. | ................. | 712/20 |

OTHER PUBLICATIONS

Suganuma et al. "Detection oand Global Optimization of Reduction Operations for Distributd Parallel Machines" 1996, ACM, 18-25.*
Rauchwerger et al. "LRPD Test: Speculative Run-Time Parallelization of Loops with Privatization and Reduction Parallelization" 1999, IEEE v 10 No. 2, 160-180.*
Pottenger "Induction Variable Substitution and Reduction Recognition in the Polaris Parallelizing Compiler" 1980.*
Rauchwerger, L., "Run-Time Parallelization:It's Time Has Come", Journal of Parallel Computing, Special Issue on Language and Compilers, vol. 24, Nos. 3-4, 1998, pp. 527-556.

* cited by examiner

*Primary Examiner*—Kakali Chaki
*Assistant Examiner*—Jason Mitchell
(74) *Attorney, Agent, or Firm*—Anthony V. S. England (57) ABSTRACT

This invention relates to a method, system and program product to detect reduction variables in assignment statements in the source code for enabling the parallel execution of program loops. The reduction variables found using the method herein described can be tagged to the respective loops and passed to a compiler through compiler directives for parallelizing the reduction operation, along with the information about each variable's respective associative operator.

17 Claims, 5 Drawing Sheets

DETECTION OF REDUCTION VARIABLES IN AN ASSIGNMENT STATEMENT

FIELD OF THE INVENTION

This invention relates to detecting reduction variables in assignment statements in the source code for enabling the parallel execution of program loops.

BACKGROUND OF THE INVENTION

A loop in a computer program can be executed in fully parallel form if the output from the loop does not depend in any way upon the execution ordering of the data accesses from different iterations. Compiler writers often refer to such loops as doall loops. However, when a loop is not a doall loop, it may sometimes be possible to arrange the iterations into several groups such that the iterations in each group can be executed in fully parallel form provided certain synchronization conditions are met between a group completing its execution and the next group beginning its execution. An extreme case of partially parallelizable loop is the completely sequential loop where the number of groups is exactly the same as the number of iterations.

Whether a loop is fully parallelizable or not may be determined by analyzing the data dependence relations between the statements in the loop body. There are three possible types of dependencies between two statements that access the same memory location: flow (write then read), anti (read then write), and output (write then write). The simplest situation occurs when there is no flow, anti, or output dependencies, in which case all iterations in the loop are independent and can be executed in parallel.

Flow dependence: Consider the code fragment given below—

```
do i = 1, n
   A(k(i)) = A(k(i)) + A(k(i-1))
   if(A(k(i)) .eq. .true.) then
   ... ... ... ... ...
   endif
enddo
```

Since Flow dependence exists between accesses in different iterations of the loop, its semantics cannot be guaranteed if the loop is executed as a doall loop. For example, in the above code fragment, the iterations must be executed in the order of iteration number because iteration i+1 needs the value that is produced in iteration i, for $2 \leq i \leq n$.

Anti or Output dependence without Flow dependence: In this case, the loop must be modified to remove these dependencies before it can be executed in parallel. Unfortunately, not all situations can be handled efficiently. However, two important transformations can be applied to the loop: (1) Privatization, and (2) Reduction parallelization.

Privatization can eliminate certain types of anti and output dependencies by creating, whenever possible, for each participating processor executing the loop, private copies of program variables that give rise to anti or output dependencies. The following example illustrates a loop that can be executed in parallel by privatization.

```
       do i = 1, n/2
S1:       tmp = A(2*i)
          A(2*i) = A(2*i-1)
S2:       A(2*i-1) = tmp
       enddo
```

The anti dependencies between statement S1 of iteration i and statement S2 of iteration i+1, for $1 \leq i < n/2$, can be removed by privatizing the temporary variable tmp.

In Reduction Parallelization, a reduction variable is defined as a variable whose value is used in one associative operation of the form x=x exprn, where ⓧ is the associative operator and x does not occur in exprn or anywhere else in the loop. The operand exprn is called the associative operand. By their very nature, reduction variables are accessed in a specific pattern. A simple and frequently occurring example of a reduction is illustrated by statement S1 in the following example:

```
       do i = 1, n
         do j = 1, m
S1:        A(j) = A(j) + exprn
         enddo
       enddo
``` where the operator , in this case is the + operator. The access pattern of the array A( ) is read, modify, write, and the function performed by the loop is to add a value computed in each iteration to the value stored in A( ). This form of reduction is often called an update.

Reduction parallelization requires two steps: recognition of the reduction variable, and parallelizing the reduction operation.

While parallelization can be performed at run-time to a certain extent, it is desirable whenever possible, to perform it at compile time as it minimizes the execution overhead that may dilute the benefits of parallelization. Techniques for run-time parallelization have been described by Rauchwerger, L., in 'Run-Time Parallelization: It's Time Has Come', Journal of Parallel Computing, Special Issue on Language and Compilers, Vol. 24, Nos. 3–4, 1998, pp. 527–556.

The difficult part in reduction parallelization faced by compilers is in recognizing the reduction statements. So far, this problem has been handled, with limited success, at compile-time by syntactically pattern matching the loop statements with a template of a generic reduction, and then performing a data dependence analysis of the variable under consideration ensuring that it does not appear anywhere else in the loop other than in the reduction statement. The method is inadequate because there are many more patterns than there are templates.

U.S. Pat. No. 5,481,723 describes a system and method for enabling compile time parallelization for the specific case of nested do loops. It is however, not suitable for unnested loops.

The present invention describes a novel method for detecting reduction variables in source code as a pre-process before compilation. This process requires recasting of the source code expressions in accordance with the method described in U.S. Pat. Publication No. 2001/0003211 A1.

For completeness, it is to be noted that parallelizing the reduction method in a scalable manner, requires the reduction variable to be privatized in the transformed doall and the final result of the reduction operation to be calculated in an inter-processor reduction phase following the doall, that is, a scalar is produced using the partial results computed in each processor as operands for a reduction operation (with the same operator) across the processors. If the reduction operation is commutative, then the cross-processor merging phase can be done in any order, else the merging phase will have to be done in an orderly manner.

SUMMARY OF THE INVENTION

The object of this invention is to detect reduction variables at the source code level for facilitating program loop parallelization without the use of template matching and before any compilation takes place.

To achieve this object the invention describes a method, system and computer program product for detecting reduction variables in a loop applied on the source code rather than the intermediate structures created by a compiler As a first step of the aforementioned method, the Right hand side (RHS) of each assignment statement of the loop body is recast into a reduced form. For each recast assignment statement, the variable on the Left-hand side (LHS) is determined and its corresponding search string is created. The RHS of each recast assignment statement of the loop body is scanned for its corresponding search string and based on certain pre-determined conditions being met, a potential reduction table is populated. The potential reduction table contains references to potential reduction variables and their corresponding assignment statements. After the reduction table has been completed, all entries associated with potential reduction variables found invalid based on predetermined conditions are deleted from the table. Subsequently the associative operator for each of the remaining assignment statements in the reduction table is determined. The reduction table is once again pruned of entries found invalid based on further predetermined conditions. The potential reduction variables remaining in the reduction table are the desired reduction variables.

It is assumed when implementing the method of the present invention that the loop body can be treated as a simple block, i.e., it comprises a sequence of zero or more instructions with no branches, and no branch targets or labels. Each simple block may correspond to a linear sequence of statements, a single statement, or even an individual operation. In a simple block all the statements or operations execute (barring exceptions). If an assignment statement in a loop body contains function calls, then only those calls in the statement are in-lined for which the functions being called have the LHS variable appearing in the parameter list of the function call. If after the process of in-lining the functions, the loop body ceases to be a simple block, then the method of the present invention cannot be applied.

BRIEF DESCRIPTION OF THE DRAWINGS

The invention will now be described with reference to the accompanying drawings.

FIGS. 1-a, 1-b and 1-c show a flowchart for determining reduction variables.

DETAILED DESCRIPTION

Figure 1A:
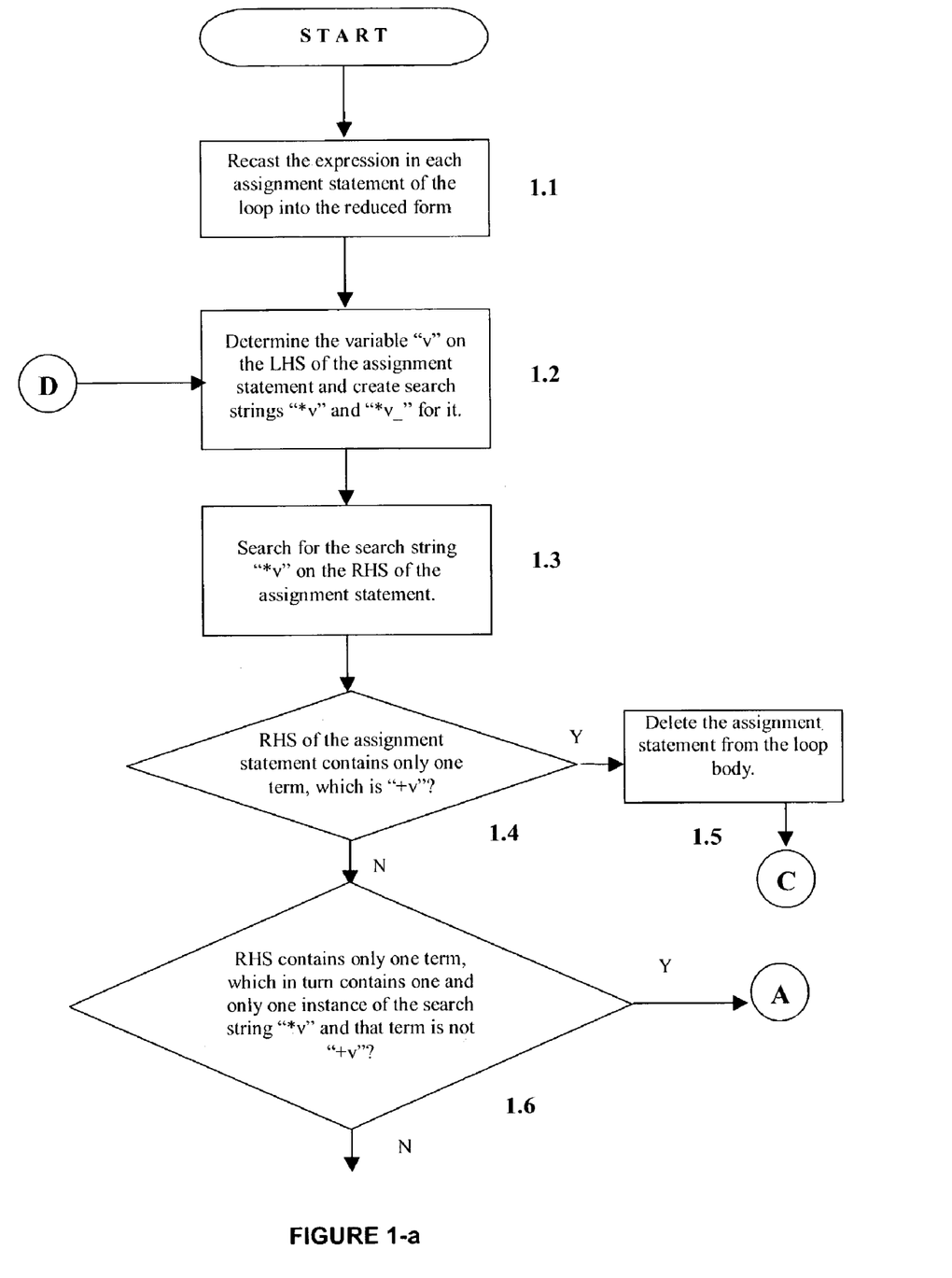
Figure 1B:
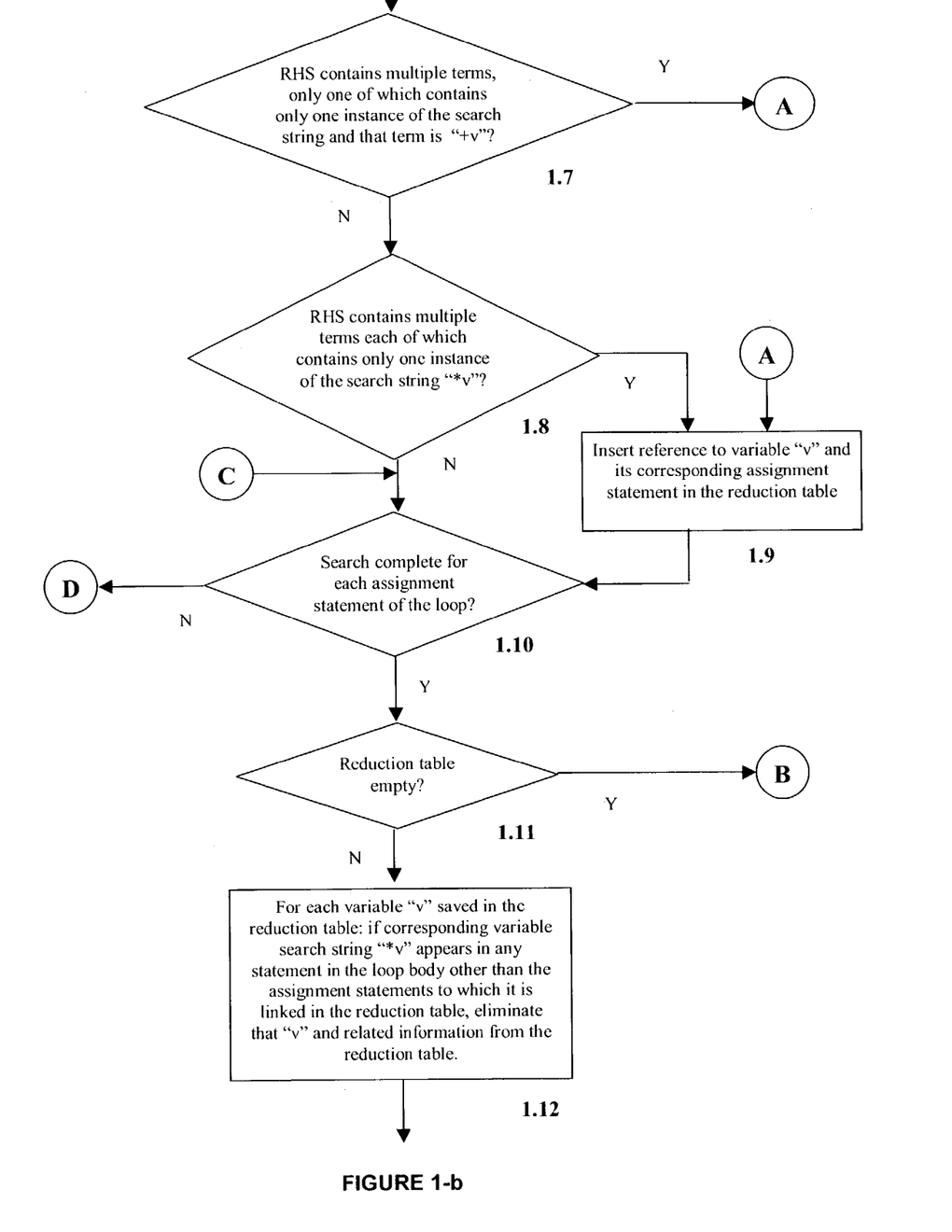
Figure 1C:
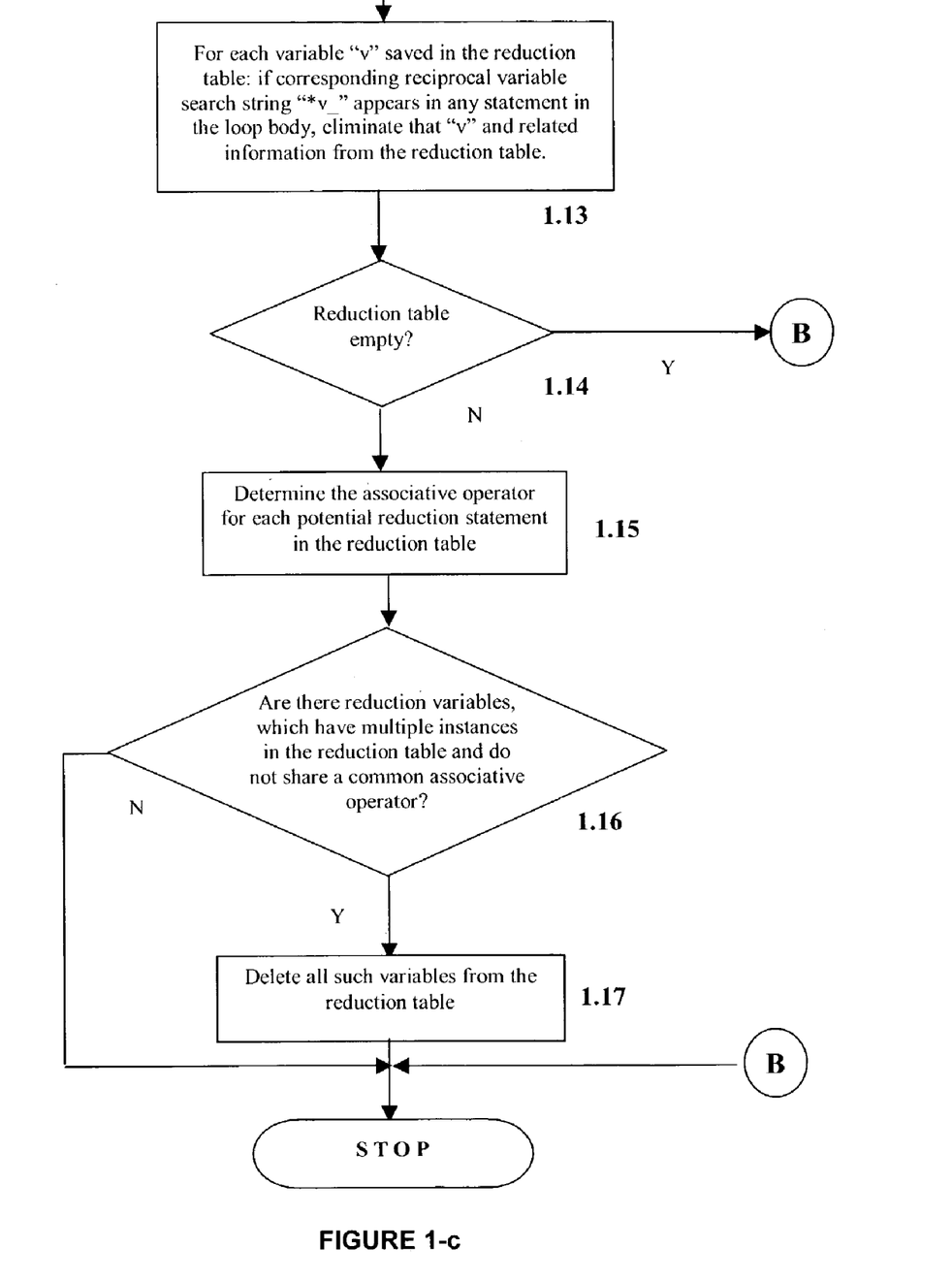

As shown in FIGS. 1-a, 1-b and 1-c the expression in each assignment statement of the loop is recast (1.1) into a reduced form to facilitate certain character string search operations, in accordance with the format specified below wherein the expression:

is represented in expanded form with all brackets removed, has each division operation replaced by a multiplication operation applied to the reciprocal of the associated variable or constant, has each constant represented as a character string of constant length using a floating point format, such as the constant 62.1702 represented as "0.621 702e+02", has each term commence with a unary '+' or '−' operator followed by a constant operand, followed by variable operands, if any, where between any two operands in a term is a multiplication operator and the term itself cannot be simplified further in terms of the given variable operands, has all variable operands appearing in a term in a sorted sequence from left to right in order of non-decreasing ASCII value, has all terms, which differ from each other only in their constant operand, consolidated into a single term, and has all terms appearing in an expression in a predefined sorted sequence from left to right .

In the First phase of the algorithm, for each assignment statement in turn, the variable "v" on the Left-hand side (LHS) of the assignment statement is determined and character strings "*v" and "*v_", respectively, called the variable search string and the reciprocal variable search string are created (1.2) for it. In the search strings, "*" represents the multiplication operator, "v" represents a variable operand, and "v_" indicates the reciprocal of the variable "v". Subsequently, a search for the search string "*v" is performed (1.3) on the right hand side (RHS) of the statement. The RHS of the assignment statement is examined (1.4) to determine whether it contains only one term and that term is equivalent to '+v'. If such is the case, the assignment statement is deleted (1.5) from the loop body because the statement represents an identity. Note that a search for the string "*v", implies a search for "v" as a factor in the term it appears in.

Furthermore, if any of the following conditions are encountered:

1. RHS contains only a single term (1.6), which in turn contains one and only one instance of the search string "*v" and that term is not equivalent to '+v',
2. RHS contains multiple terms (1.7) of which only one of the terms contains one and only one instance of the search string "*v" and that term is equivalent to '+v',
3. RHS contains multiple terms (1.8) each of which contains one and only one instance of the search string "*v", then the variable "v" is a potential reduction variable and its corresponding assignment statement is a potential reduction statement. A reference to the potential reduction variable and the potential reduction statement is inserted (1.9) in a reduction table. The above mentioned First phase steps are repeated for all assignment statements of the loop (1.10).

Subsequently, the reduction table is checked to determine whether it is empty or not (1.11). If the reduction table is empty, implying no reduction variable was detected in the first phase of the algorithm, then the search process is terminated. However, if the table is not empty, the search proceeds to the second phase.

In the Second phase of the algorithm, for each variable "v" in the reduction table, the entire loop body is searched for the search string "*v" (1.12) and also for the string "*v_", where "v_" is the reciprocal of "v", (1.13) to eliminate invalid reduction variables from the reduction table. If the search string "*v" (1.12) appears in any statement other than the assignment statements to which it is linked in the potential reduction table, then all entries related to the variable "v" in the reduction table are deleted. Furthermore, if the string "*v_" (1.13) appears anywhere in the loop body, then in this case also all entries for the variable "v" in the reduction table are deleted.

The reduction table is once again checked (1.14), and if found empty, the algorithm is terminated indicating that no reduction variable was found in the loop body. However, if the table is not empty, the algorithm proceeds to the Last phase.

In the Last phase of the algorithm, the associative operator for each potential reduction statement in the reduction table is determined (1.15). Furthermore, references to potential reduction variables having multiple instances in the reduction table that do not share a common associative operator (1.16) are deleted from the table (1.17). This completes the identification of reduction variables in the form of entries in the reduction table. The variables remaining in the reduction table are the desired reduction variables.

Figure 2:
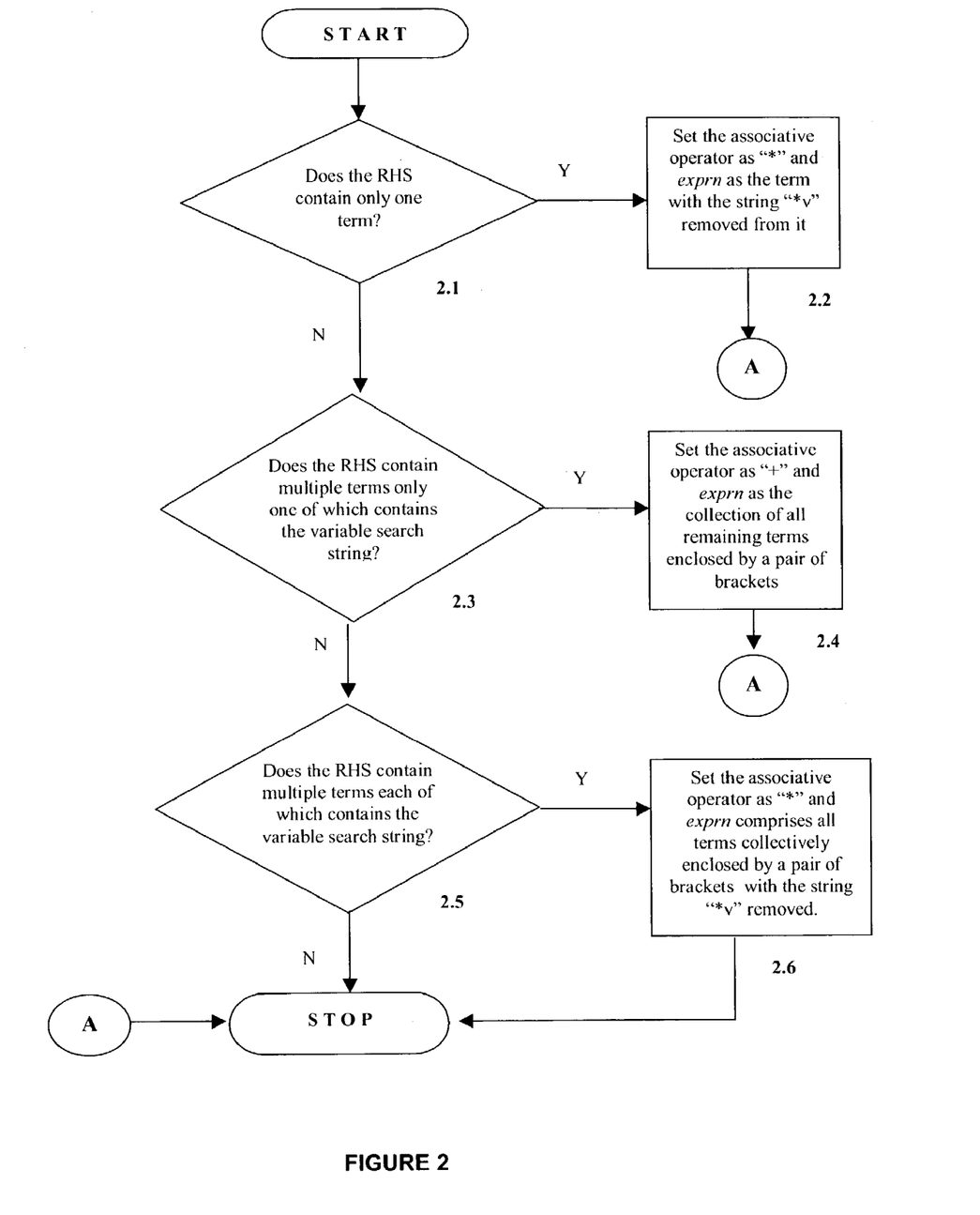
FIG. 2 shows a flowchart for determining the associative operator for a reduction statement.

FIG. 2 shows the method for determining the associative operator for a reduction statement referenced in the reduction table. Note that in a reduction statement a reduction variable "v" is defined as a variable whose value is used, in effect, in one associative operation of the form v=v exprn, where is the associative operator, and v does not appear in the associative operand exprn. The steps followed are listed below:

1. If the RHS contains only one term (2.1), then the associative operator is the multiplication operator "*" (2.2) and the associative operand exprn comprises the term with the string "*v" removed from it.
2. If the RHS contains multiple terms (2.3), only one of which contains the variable search string "*v" (this term is equivalent to '+v'), then the associative operator is the plus operator "+" (2.4) and the associative operand exprn comprises all remaining terms enclosed by a pair of brackets.
3. If the RHS contains multiple terms (2.5), each of which contain the variable search string "*v", then the associative operator is the multiplication operator "*" (2.6) and the associative operand exprn comprises all terms collectively enclosed by a pair of brackets with the string "*v" removed from each of those terms.

Figure 3:
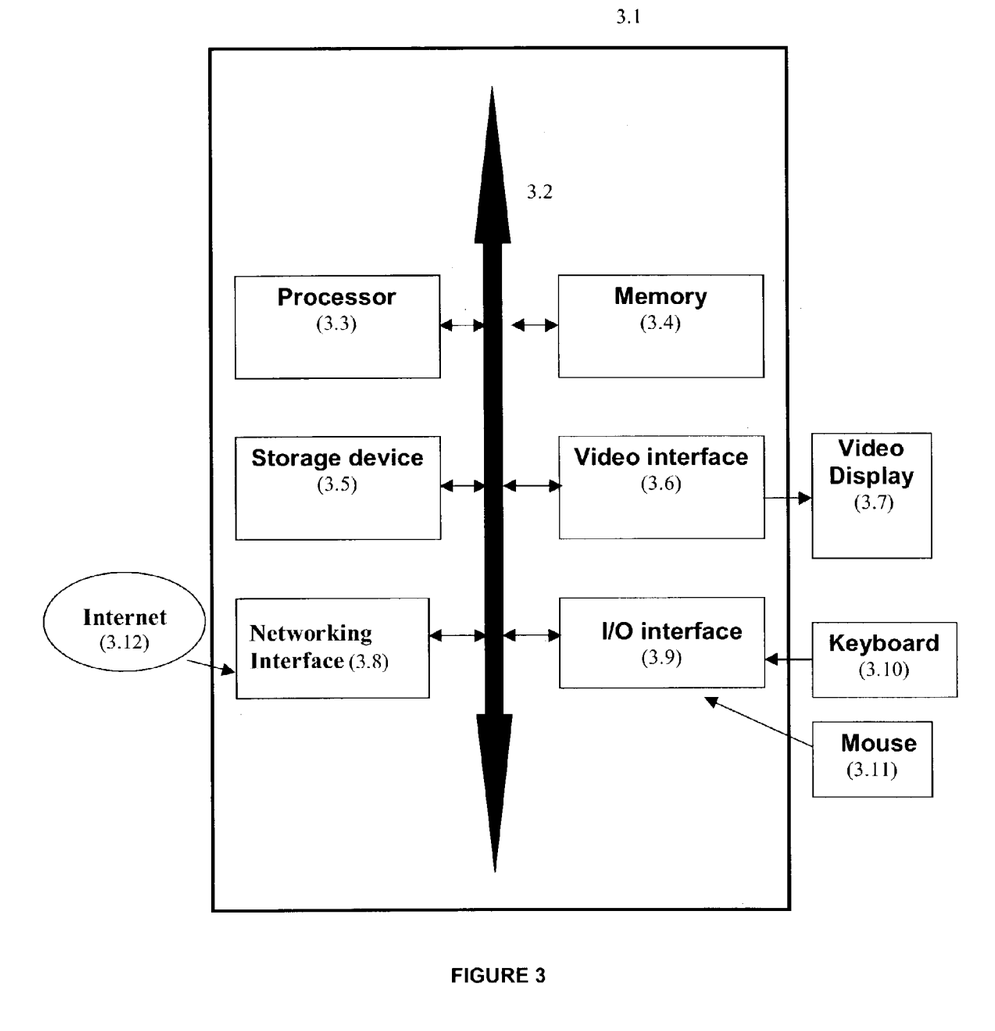
FIG. 3 shows a system in accordance with the present invention

FIG. 3 shows a computing system capable of detecting reduction variables at the source code level for facilitating parallelization in the execution of loops. The computing system (3.1) consists of various subsystems interconnected with the help of a system bus (3.2). The system (3.1) incorporates a storage device (3.5) used for storing the means for detecting reduction variables and the source code containing the loop to be parallelized. The source code for the loop is inputted through the keyboard (3.10), mouse (3.11) and other input devices connected to the computer system through the I/O interface (3.9). The computing system (3.1) can be connected to various networks such as LAN, WAN or the Internet (3.12) through the Networking interface (3.8).

Means for detecting reduction variables and the source code containing the loop are loaded into the memory (3.4) of the computing system (3.1), through the communication bus (3.2). The memory (3.4) holds the current instructions to be executed by the processor (3.3) along with their results. The processor (3.3) executes the instructions encoded in the recasting means to recast the expression on the right hand side (RHS) of each assignment statement of the source code program loop into a reduced form described previously in the specification. Search string creation means then determine the variable on the LHS of each recast statement and creates corresponding variable search string for this variable. Following this, the string searching means search for the variable search string on the RHS of the reduced expression.

Subsequently, instructions in the reduction table creating means are executed for creating a reduction table, detecting potential reduction variables in the source code loop based on certain conditions and inserting references to valid potential reduction variables and their corresponding assignment statements in the reduction table. Deleting means remove references to invalid reduction variables from the reduction table based on pre-determined conditions. As a last step, the processor (3.3) executes the instructions encoded in the associative operator determining means for ascertaining the associative operator for the reduction statements remaining in the reduction table. The processor (3.3) used to execute the means could be a microprocessor in case of a PC, a dedicated semiconductor chip or any other device capable of functioning as a digital computer.

Those of ordinary skill in the art will appreciate that the aforementioned means are instructions for operating on a computing system. The means are capable of existing in an embedded form within the hardware of the computing system or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:

a) conversion to another language, code or notation b) reproduction in a different material form.

The depicted example in FIG. 3 is not meant to imply architectural limitations and the configuration of the incorporating computing system of the means may vary depending on the implementation. Any kind of computer system or other apparatus adapted for executing the means described herein can be employed for practicing the invention. A typical combination of hardware and software could be a general purpose computer system with a computer program that when loaded and executed, controls the computer system such that it carries out the means described herein. Other examples of the incorporating computing system that may be used are notebook computers or hand held computers in addition to taking the form of a PDA, web kiosks or even Web appliances.

EXAMPLES

The invention will now be described with reference to the following examples

Example 1

1: do i=1, n
2: x=c*d
3: ai=ai+2.0
4: bi=2.0*bi+(c−d)*bi−bi
5: y=c*y+d*y−3.0*y
6: z=2*a+z−a−a
7: w=w*w/u
8: u=u/w
9: enddo After recasting the expressions in each assignment statement of the loop into a reduced form, we have 1: do i=1, n
2: x=+0.100000e+01*c*d
3: ai=+0.200000e+01+0.100000e+01*ai
4:     bi=+0.100000e+01*bi+0.100000e+01*bi*c−0.100000e+01*bi*d
5:     y=+0.100000e+01*c*y+0.100000e+01*d*y−0.300000e+01*y
6: z=+0.100000e+01*z
7: w=+0.100000e+01*u_*w*w
8: u=+0.100000e+01*u*w__
9: enddo After applying the First phase of the algorithm, we note that x is not a reduction variable since it does not appear on the right hand side, ai is a potential reduction variable since it appears in only one term which is "+0.100000e+01*ai", bi is a potential reduction variable since it appears in all terms and each term has only one instance of "*bi", y is a potential reduction variable since it appears in all terms and each term has only one instance of "*y", z is not a reduction variable since the right hand side has only one term which is "+0.100000e+01*z" (indicating that the statement expresses an identity and is to be deleted), w is not a reduction variable since there is more than one instance of "*w" in the only term on the right hand side, u is a potential reduction variable since the only term on the right hand side has only one instance of "*u".

Potential Reduction Table

| Variable | Statement no. | Comments |
|----------|---------------|----------|
| ai | 3 | Potential Reduction Variable |
| bi | 4 | Potential Reduction Variable |
| y | 5 | Potential Reduction Variable |
| u | 8 | Potential Reduction Variable |

After applying the Second phase of the algorithm, we have:

1: do i=1, n
2: x=+0.100000e+01*c*d
3: ai=+0.200000e+01+0.100000e+01*ai
4:     bi=+0.100000e+01*bi+0.100000e+01*bi*c−0.100000e+01*bi*d
5:     y=+0.100000e+01*c*y+0.100000e+01*d*y−0.300000e+01*y
6: —deleted—
7: w=+0.100000e+01*u_*w*w
8: u=+0.100000e+01*u*w__
9: enddo from which it can be concluded that:

u is no longer a reduction variable since it also appears in statement 7 as u_.

Reduction Table

| Variable | Statement no. | Comments |
|----------|---------------|----------|
| ai | 3 | Potential Reduction Variable |
| bi | 4 | Potential Reduction Variable |
| y | 5 | Potential Reduction Variable |

After the Last phase of the algorithm, we have the list of reduction variables along with their associative operators as shown below:

Reduction Table with Associative Operation

| Variable | Statement no. | Operator | Statement |
|----------|---------------|----------|-----------|
| ai | 3 | + | ai = ai + 2.0 |
| bi | 4 | * | bi = bi * (1.0 + c − d) |
| y | 5 | * | y = y * (−3.0 + c + d) |

Example 2

1: do i=1, n
2: y=c*y+d*y−3.0*y
3: y=(e*f+g)*y
4: z=z+2
5: z=z*a−b*z
6: enddo

After recasting the expressions in each assignment statement of the loop into a reduced form, we have 1: do i=1, n
2:     y=+0.100000e+01*c*y+0.100000e+01*d*y−0.300000e+01*y
3: y=+0.100000e+01*e*f*y+0.100000e+01*g*y
4: z=+0.200000e+01+0.100000e+01*z
5: z=+0.100000e+01*a*z−0.100000e+01*b*z
6: enddo After applying the First phase of the algorithm, we note that y is a potential reduction variable since it appears in all terms and each term has only one instance of "*y" in statement 2, y is a potential reduction variable since it appears in all terms and each term has only one instance of "*y" in statement 3, z is a potential reduction variable since "*z" appears in only one term which is "+0.100000e+01*z" in statement 4, z is a potential reduction variable since it appears in all terms and each term has only one instance of "*z" in statements 5.

Reduction table

| Variable | Statement no. | Comments |
|----------|---------------|----------|
| y | 2 | Potential Reduction Variable |
| y | 3 | Potential Reduction Variable |
| z | 4 | Potential Reduction Variable |
| z | 5 | Potential Reduction Variable |

After the Second phase of the algorithm, we note that
1: do i=1, n
2:    y=+0.100000e+01*c*y+0.100000e+01*d*y–0.300000e+01*y
3: y=+0.10000e+01*e*f*y+0.100000e+01*g*y
4: z=+0.100000e+01*z+0.200000e+01
5: z=+0.100000e+01*a*z–0.100000e+01*b*z
6: enddo from which it is clear that y and z remain potential reduction variables without any changes in the reduction table.

After the Last phase of the algorithm, we note that:

Reduction Table

| Variable | Statement no. | Operator | Statement |
|---|---|---|---|
| y | 2 | * | y = y * (c + d – 3.0) |
| y | 3 | * | y = y * (e * f + g) |
| z | 4 | + | z = z + 2.0 |
| z | 5 | * | z = z * (a – b) | from which we conclude that
  y continues as a reduction variable since all instances of y have associated with it the same associative operator,
  z ceases to be a reduction variable since different instances of z have different associative operators associated with them.

Therefore, the Reduction table with associative operators is:

| Variable | Statement no. | Operator | Statement |
|---|---|---|---|
| y | 2 | * | y = y * (c + d – 3.0) |
| y | 3 | * | y = y * (e * f + g) |

Reduction Table with Associative Operator

It will be apparent to those with ordinary skill in the art that the foregoing is merely illustrative and is not intended to be exhaustive or limiting, having been presented by way of example only and that various modifications can be made within the scope of the above invention.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

The invention claimed is:

1. A method for detecting reduction variables in a source code program loop to enable execution parallelization, comprising the steps of:
   (a) recasting a right hand side (RHS) expression of assignment statements of the source code program loop into a reduced form,
   (b) determining for such an assignment statement its corresponding left hand side (LHS) variable and creating a corresponding variable search string for the LHS variable to enable a search for the LHS variable as a factor in the recast expression,
   (c) creating a corresponding reciprocal variable search string for a reciprocal of the LHS variable to enable a search for the reciprocal of the LHS variable as a factor in the recast expression,
   (d) searching in the recast RHS expression of each said assignment statement for the variable search string corresponding to the LHS variable,
   (e) searching in the recast RHS expression of each said assignment statement for the reciprocal variable search string corresponding to the reciprocal of the LHS variable,
   (f) inserting references to the LHS variables and their corresponding assignment statements in a reduction table based on pre-determined conditions,
   (g) deleting references to the LHS variables and their corresponding assignment statements from the reduction table based on predetermined conditions, and
   (h) for each of the LHS variables and their corresponding assignment statements referenced in the reduction table determining a corresponding associative operator and associative operand.

2. The method as claimed in claim 1, wherein:
   said expression recast in step (a) is represented in expanded form with all brackets removed,
   said recast expression has each division operation replaced by a multiplication operation applied to a reciprocal of an associated variable or constant,
   said recast expression has each constant represented as a character string of constant length using a floating point format,
   said recast expression has each term commence with a unary '+' or '–' operator followed by a constant operand, followed by variable operands, if any, where between any two operands in one of the terms is a multiplication operator, and the term itself cannot be simplified further in terms of the variable operands,
   said recast expression has all of the variable operands appearing in any of the terms in a sorted sequence from left to right in order of non-decreasing ASCII value,
   said recast expression has all of the terms, which differ from each other only in their constant operand, consolidated into a single term, and
   said recast expression has all terms appearing in an expression in a predefined sorted sequence from left to right.

3. The method as claimed in claim 1, wherein ones of the assignment statements representing an identity are deleted from the source code program loop.

4. The method as claimed in claim 1, wherein the reference to one of the LHS variables and its corresponding assignment statement is inserted in the reduction table when the RHS expression of the assignment statement contains only a single term and that term contains one and only one instance of the variable search string corresponding to the LHS variable, and the assignment statement is not an identity.

5. The method as claimed in claim 1, wherein the reference to one of the LHS variables and its corresponding assignment statement is inserted in the reduction table when the RHS expression of the assignment statement contains multiple terms, of which only one of the terms contains one and only one instance of the variable search string corresponding to the LHS variable and that one of the terms comprises only the LHS variable preceded by a plus arithmetic operator.

6. The method as claimed in claim 1, wherein the reference to one of the LHS variables and its corresponding assignment statement is inserted in the reduction table when the RHS expression of the assignment statement contains multiple terms, each of which contains one and only one instance of the variable search string corresponding to the LHS variable.

7. The method as claimed in claim 1, wherein all references to one of the LHS variables and its corresponding assignment statements are deleted from the reduction table when the variable search string corresponding to the LHS variable appears in the RHS expression of any assignment statement in the loop body other than the corresponding assignment statements listed in the reduction table.

8. The method as claimed in claim 1, wherein all references to one of the LHS variables and its corresponding assignment statements are deleted from the reduction table when the reciprocal variable search string corresponding to the reciprocal of the LHS variable appears in any assignment statement in the loop body.

9. The method as claimed in claim 1, wherein the associative operator of an assignment statement listed in the reduction table is an arithmetic multiplication operator (*) when the RHS expression of the assignment statement contains only one term, and that term has only one instance of the variable search string corresponding to the LHS variable of the assignment statement.

10. The method as claimed in claim 9, wherein the associative operand is the term divided by the LHS variable.

11. The method as claimed in claim 1, wherein the associative operator of an assignment statement listed in the reduction table is an arithmetic plus operator (+) when the RHS expression of the assignment statement contains multiple terms, only one of which contains the variable search string corresponding to the LHS variable of the assignment statement and this term comprises only the LHS variable preceded by the arithmetic plus operator.

12. The method as claimed in claim 11, wherein the associative operand is the collection of all remaining terms enclosed by a pair of brackets.

13. The method as claimed in claim 1, wherein the associative operator of an assignment statement listed in the reduction table is an arithmetic multiplication operator (*) when the RHS expression of the assignment statement contains multiple terms each of which contains only one instance of the variable search string corresponding to the LHS variable of the assignment statement.

14. The method as claimed in claim 13, wherein the associative operand is the collection of all terms from which the LHS variable has been divided out.

15. The method as claimed in claim 1, wherein references to LHS variables having multiple instances listed in the reduction table that do not share a common associative operator are deleted from the table.

16. A system for detecting reduction variables in a source code program loop to enable execution parallelization comprising:
   at least one central processing unit,
   at least one system bus
   at least one communication unit connected to the system bus, and
   at least one memory unit connected to the system bus, containing:
     recasting means for recasting the right hand side (RHS) expression of assignment statements of the source code program loop into a reduced form,
     means for determining a left hand side (LHS) variable of such an assignment statement,
     search string creation means for creating a corresponding variable search string for the LHS variable of the assignment statement to enable a search for the LHS variable as a factor in the recast expression,
     search string creation means for creating a corresponding reciprocal variable search string for a reciprocal of the LHS variable of the assignment statement to enable a search for the said reciprocal of the LHS variable as a factor in a recast expression,
     string searching means for detecting the variable search string corresponding to the LHS variable of the assignment statement in the RHS expression of the assignment statement,
     string searching means for detecting the reciprocal variable search string corresponding to the reciprocal of the LHS variable of the assignment statement in the RHS expression of the assignment statement,
     reduction table creating means for creating a reduction table for saving references to potential reduction variables and their corresponding assignment statements based on pre-determined conditions,
     detecting means for detecting potential reduction variables,
     saving means for saving references to the potential reduction variables and their corresponding assignment statements in the reduction table,
     deleting means for removing references to the potential reduction variables and their corresponding assignment statements from the reduction table based on pre-determined conditions,
     associative operator determining means for ascertaining an associative operator of each of the assignment statements referenced in the reduction table, and
     associative operand determining means for ascertaining an associative operand of each of the assignment statements referenced in the reduction table.

17. A computer program product comprising computer readable program code stored on computer readable storage medium embodied therein for detecting reduction variables in a source code program loop to enable execution parallelization, comprising:
   computer readable program code means configured for recasting a right hand side (RHS) expression of assignment statements of the source code program loop into a reduced form,
   computer readable program code means configured for determining a left hand side (LHS) variable of such an assignment statement and creating a variable search string and a reciprocal variable search string corresponding to the LHS variable,
   computer readable program code means configured for finding the variable search string corresponding to the LHS variable in the RHS expression of the assignment statement,
   computer readable program code means configured for finding the reciprocal variable search string corresponding to the LHS variable in the RHS expression of the assignment statement,
   computer readable program code means configured for creating a reduction table for saving references to LHS variables identified as potential reduction variables and their corresponding assignment statements based on pre-determined conditions,
   computer readable program code means configured for detecting potential reduction variables, computer readable program code means configured for saving references to potential reduction variables and their corresponding assignment statements in the reduction table, computer readable program code means configured for deleting references to potential reduction variables and their corresponding assignment statements from the reduction table based on pre-determined conditions, computer readable program code means configured for determining an associative operator for each assignment statement referenced in the reduction table, and computer readable program code means configured for determining an associative operand for each assignment statement referenced in the reduction table.

* * * * *